INVENTOR
JOHN M. SIPOS
BY Ronald B. Sherr
ATTORNEY

United States Patent Office 3,525,845
Patented Aug. 25, 1970

3,525,845
WELDING TORCH
John M. Sipos, Easton, Pa., assignor to Air Products and Chemicals, Inc., Allentown, Pa., a corporation of Delaware
Filed Feb. 18, 1969, Ser. No. 800,084
Int. Cl. B23k 9/16, 9/24, 35/38
U.S. Cl. 219—75                                                3 Claims

ABSTRACT OF THE DISCLOSURE

A welding torch of the tungsten electrode and inert gas type having flow passages for the shielding gas which cause the gas to flow from the torch body to an annular chamber around the electrode holding collet in the torch head and from this chamber through a plurality of circumferentially spaced passages formed in a barrel member containing the collet whereby the gases are discharged into the nozzle of the torch head at locations surrounding the electrode.

BACKGROUND OF THE INVENTION

This invention relates to the field of welding torches of the tungsten electrode and inert gas type known in the art and referred to hereinafter as a "TIG" torch.

TIG torches are well-known in the art and are conventionally provided with a torch head at one end having a barrel member containing a collet to hold the electrode in position and means for actuating the collet to tighten or loosen its grip upon the electrode. The shielding gas is delivered to the torch head and passes therethrough for discharge into a nozzle. One of the problems involved in the design of TIG torches is that of providing for unobstructed and uniform gas flow through the torch head in a manner to achieve a smooth and even shielding of the electrode and the weld puddle. In addition, it is necessary to provide a construction of the torch head which is able to withstand substantial mechanical stresses and high temperature conditions while, at the same time, being of simple construction whereby initial cost and maintenance are minimized.

SUMMARY OF THE INVENTION

In accordance with the invention there is provided a TIG torch which is constructed to provide a path of flow of shielding gas through the head of the torch which results in a smooth and even flow and distribution of the gas at the nozzle of the torch. Briefly stated, this feature of the invention is achieved by providing an annular chamber for receiving the gases from the handle of the torch and a plurality of circumferentially spaced passageways surrounding the electrode and extending from the annular chamber through the barrel of the torch to the region of the nozzle.

DESCRIPTION OF THE PREFERRED EMBODIMENT

Figure 1:
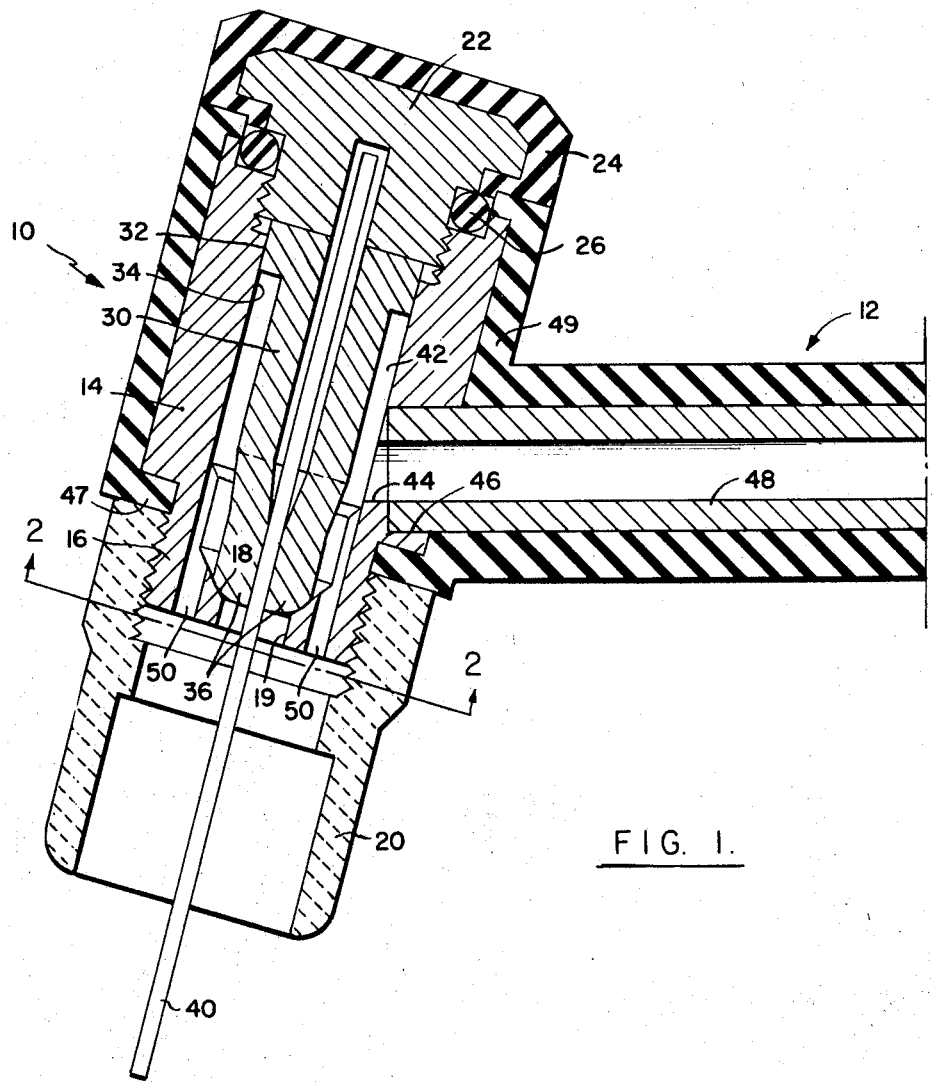
FIG. 1 is an enlarged longitudinal section of TIG torch head in accordance with the present invention.
Figure 2:
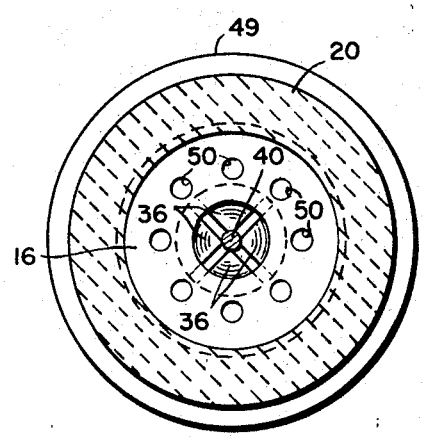
FIG. 2 is an enlarged sectional view taken on line 2—2 of FIG. 1.

The welding torch in accordance with the invention comprises a torch head indicated generally at 10, and joined with the handle portion, indicated generally at 12, at an angle as is illustrated in FIG. 1 in accordance with conventional practice. The torch head 10 includes a one-piece barrel member 14 which is in the form of a generally hollow cylinder the upper portion of which is internally threaded and the lower portion of which is externally threaded. At its lower end, the barrel member 14 is provided with a reduced diameter portion 16 which forms an internal conical wall 18. The conical wall 18 converges inwardly as it progresses towards the lower end of the barrel member 14 and terminates at an opening 19 formed at the bottom of the barrel member 14.

A ceramic nozzle 20 threadedly engages the external threads at the lower end of the barrel member 14. At the upper end of the barrel member 14, a cap 22 is positioned in threaded engagement with the internal threads therein. The cap is provided with an enlarged head which is enclosed in a suitable molded insulation indicated at 24. An O-ring 26 is positioned in compression between the enlarged head of the cap 22 and a recessed counterbore formed at the upper end of the barrel member 14. The O-ring 26 serves to provide an effective seal between the cap 22 and the upper end of the barrel member 14.

A collet 30 is positioned within the barrel member 14 and is held between the lower end of the cap 22 and the conical wall 18. The collet 30 is provided with an enlarged flange portion 32 at its upper end, the periphery of which contacts a cylindrical wall 34 formed at a medial portion of barrel member 14. The collet 30 comprises four flexible arm portions 36 the lower ends of which bear against the conical wall 18 of the barrel member 14. The lower ends of the flexible arm portions 36 are rounded as is shown in FIG. 1. By this arrangement, in response to the movement of the cap 22 inwardly to force the collet 30 downwardly, the collet arms 36 are cammed radially inwardly into tight gripping engagement with a tungsten electrode indicated at 40. In this manner the collet 30 is used to hold the electrode 40 in the desired position for welding. In use, the electrodes are gradually consumed so that it is necessary to permit the adjustment thereof during the use of the torch. For this reason, it is necessary that the securing means be capable of gripping and releasing the electrode to permit the adjustment thereof to the proper position for welding. This is achieved by the actuation of the collet 30 towards gripping and releasing positions by means of the rotation of the cap 22 to cause inward or outward movement of the collet arms 36 as is desired.

The barrel member 14 cooperates with the exterior of the collet 30 to define an annular chamber 42 within the barrel member 14 at a generally medial location thereof. The barrel member 14 is provided with a side port 44 aligned with this annular chamber 42 and with a counterbore 46 which receives and is rigidly connected to a gas and current supply tube 48. The exterior surfaces of the barrel member 14 and the tube 48 are covered with an integral molded insulating cover 49 which may be composed of a suitable insulating material. The upper end of the nozzle 20 seats against and is sealed by an annular lip portion 47 formed by this insulating cover 49. It will also be noted that the insulating cover 49 extends over the upper peripheral edge of the barrel member 14 for contact with an opposing portion of the insulating cover 24 for the cap 22.

The reduced diameter portion 16 of the barrel member 14 is provided with eight circumferentially, equally spaced bores 50 extending axially through the barrel member from the lower end of the barrel member 14 into communication with the annular chamber 42. These bores 50 thus provide passages for the flow of gas from the annular chamber 42 into the nozzle 20.

In the operation of the welding torch in accordance with the invention, the welding current is conveyed to the electrode 40 from a suitable supply by way of the tube 48, the barrel member 14 and the collet 30. The gas is supplied through a similar path from a suitable gas supply fitting through the tube 48 and is discharged through side port 44 into the annular chamber 42 in the barrel member 14 of the torch head 10. The gas will be uniformly distributed around the annular chamber 42 and flow downwardly through the eight circumferentially spaced passages 50 and be discharged into the nozzle 20 at locations surrounding the electrode. It will be apparent that by this arrangement the gas flow will be smooth and equally distributed around the electrode and the welding puddle during the welding operation. Moreover, this effective gas flow is achieved by a very simple and inexpensive construction of the various parts of the torch head 10.

Another advantage of the torch head construction is that it reduces "stub loss," i.e., the length of the electrode between the collet and the electrode tip that is included in a discarded electrode. The "stub loss" is reduced because the collet can be positioned below the gas inlet port to the torch head and close to the nozzle end.

It is to be understood that the above description is illustrative and it will be apparent that various changes may be made in the construction and arrangement of parts without departing from the scope of the invention. Accordingly, it is not desired to be limited except as required by the following claims.

I claim:

1. A welding torch comprising a handle, a torch head mounted on said handle, and means carried by said handle for delivering shielding gas to said torch head, said torch head including a hollow barrel member having a generally cylindrical internal wall portion and a reduced diameter portion defining a tapered internal wall adjacent one end of said cylindrical wall portion, a nozzle mounted on the end of said hollow barrel adjacent said tapered internal wall, an elongated welding electrode, a collet means for holding said electrode in adjusted axial positions, means holding said collet means within said barrel member with one end of said collet means being in contact with said tapered internal wall said end of said collet in contact with said tapered internal wall having a generally rounded cross-section said collet means having a cylindrical external wall having a diameter smaller than the internal wall of said hollow barrel and being in opposed relation thereto to define an annular chamber within said barrel member, passage means providing communication between said shielding gas delivery means and said annular chamber, and a plurality of passages extending axially of said barrel member and through said reduced diameter portion thereof to provide communication between said annular chamber and the end of said barrel member, said passages being spaced circumferentially around the axis of said barrel to discharge shielding gas into said nozzle at locations surrounding said electrode.

2. A welding torch according to claim 1 including a cap secured to the end of said barrel member opposite to the end receiving said nozzle, said cap being arranged to engage the collet means for forcing the rounded end of said collet into a substantially line contact with said tapered internal wall of said barrel to grip said electrode securely.

3. A welding torch according to claim 2 wherein said collet means comprises an enlarged diameter portion at the end of said collet means opposite to said rounded end in contact with the cylindrical wall portion of said barrel means to centrally position the collet means within said barrel member.

References Cited

UNITED STATES PATENTS

| | | | |
|---|---|---|---|
| 2,783,360 | 2/1967 | Osborn | 219—75 |
| 2,922,024 | 1/1960 | Cresswell | 219—74 |
| 3,030,490 | 4/1962 | Reed | 219—75 |
| 3,069,532 | 12/1962 | Hill et al. | 219—75 |
| 3,238,350 | 3/1966 | Klasson et al. | 219—75 |
| 3,250,889 | 5/1966 | Himmelman | 219—75 |

WILLIAM D. BROOKS, Primary Examiner